United States Patent
Abdo

(10) Patent No.: US 12,544,982 B1
(45) Date of Patent: Feb. 10, 2026

(54) SYSTEM AND METHOD FOR PRINTING A THREE-DIMENSIONAL OBJECT

(71) Applicant: KING SAUD UNIVERSITY, Riyadh (SA)

(72) Inventor: Basem Motea Abdullah Abdo, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/314,839

(22) Filed: Aug. 29, 2025

(51) Int. Cl.
| | |
|---|---|
| *B29C 64/386* | (2017.01) |
| *B29C 64/118* | (2017.01) |
| *B29C 64/209* | (2017.01) |
| *B29C 64/232* | (2017.01) |
| *B29C 64/241* | (2017.01) |
| *B29C 64/245* | (2017.01) |
| *B33Y 30/00* | (2015.01) |
| *B33Y 50/00* | (2015.01) |

(52) U.S. Cl.
CPC .......... *B29C 64/386* (2017.08); *B29C 64/118* (2017.08); *B29C 64/209* (2017.08); *B29C 64/232* (2017.08); *B29C 64/241* (2017.08); *B29C 64/245* (2017.08); *B33Y 30/00* (2014.12); *B33Y 50/00* (2014.12)

(58) Field of Classification Search
CPC ......... B33Y 50/00; B33Y 50/02; B33Y 30/00; B29C 64/106; B29C 64/112; B29C 64/18; B29C 64/245; B29C 64/386; B29C 64/393; B29C 64/40
USPC ................................................. 700/118, 119
See application file for complete search history.

(56) References Cited

U.S. PATENT DOCUMENTS

| | | | |
|---|---|---|---|
| 12,226,949 B2* | 2/2025 | Varghese | B29C 64/112 |
| 12,358,221 B1* | 7/2025 | Abdo | B29C 64/245 |

(Continued)

FOREIGN PATENT DOCUMENTS

| | | |
|---|---|---|
| CN | 212070691 U | 12/2020 |
| CN | 214294497 U | 9/2021 |

(Continued)

OTHER PUBLICATIONS

Tian, Jing, et al. "Additive manufacturing of wood flour/polyhydroxyalkanoates (PHA) fully bio-based composites based on micro-screw extrusion system." Materials & Design 199 (2021): 109418.

*Primary Examiner* — Jeffrey M Wollschlager

(74) *Attorney, Agent, or Firm* — Nath, Goldberg & Meyer; Joshua B. Goldberg

(57) ABSTRACT

A method of printing a three-dimensional (3D) object includes translating, via a primary control unit, received instructions into a series of electrical signals; sending, via the primary control unit, a first primary received signal or a second primary received signal to a secondary control unit, sending, via the secondary control unit, a first primary sent signal or a second primary sent signal, respectively, a primary sensor, and activating, via the primary sensor, a primary motor to move at least one pin in a first travel path or a second travel path, respectively, in an x-axis direction; and sending, via the primary control unit, a first quaternary sent signal from the series of electrical signals to a movable nozzle to cause at least one extrudable material to be extruded therefrom onto a first surface of a top build platform plate thereby creating a 3D object thereon.

14 Claims, 13 Drawing Sheets

(56) References Cited

U.S. PATENT DOCUMENTS

| | | | |
|---|---|---|---|
| 2015/0137423 A1* | 5/2015 | Ding | B29C 33/306 |
| | | | 264/308 |
| 2018/0086004 A1* | 3/2018 | Van Espen | B29C 64/393 |
| 2018/0154441 A1* | 6/2018 | Miller | B22F 10/28 |
| 2021/0046704 A1* | 2/2021 | Huttunen | B29C 64/118 |
| 2021/0221069 A1* | 7/2021 | Shen | B29C 64/393 |
| 2021/0283856 A1* | 9/2021 | Chen | B29C 64/124 |
| 2022/0118700 A1* | 4/2022 | Hunt | B29C 64/209 |
| 2022/0402208 A1* | 12/2022 | Inomoto | B29C 64/245 |
| 2023/0234290 A1* | 7/2023 | Biegelsen | B29C 64/40 |
| 2024/0140043 A1* | 5/2024 | Cole | B33Y 40/20 |
| 2025/0100078 A1* | 3/2025 | Murata | B22F 12/17 |
| 2025/0312970 A1* | 10/2025 | Abdo | B29C 64/118 |
| 2025/0345995 A1* | 11/2025 | Eck | B29C 64/245 |

FOREIGN PATENT DOCUMENTS

| | | |
|---|---|---|
| CN | 214645909 U | 11/2021 |
| CN | 215550981 U | 1/2022 |
| CN | 216506779 U | 5/2022 |

* cited by examiner

SYSTEM AND METHOD FOR PRINTING A THREE-DIMENSIONAL OBJECT

BACKGROUND

Field

The disclosure of the present application relates to a three-dimensional (3D) printer, and particularly to a system and a method for 3D printing using a movable and controllable release pin assembly.

Description of Related Art

Three-dimensional (3D) printing, also known as additive manufacturing (AM), allows users to create 3D objects based on digital designs by layering materials, such as plastics, metals and ceramics, over a building platform. This process offers several advantages over traditional manufacturing methods, including the ability to create complex geometries, reducing material waste, eliminating the need for molds or tooling, and reducing production time and costs. As 3D printing technology continues to mature, the technology is expected to become widely adopted in a wide range of industries, including healthcare, automotive, aerospace, and consumer products.

A fused deposition modeling (FDM) 3D printer operates, generally, by heating a thermoplastic filament to make the filament flowable, and depositing the flowable filament layer by layer on a platform of the FDM 3D printer. This process is relatively affordable, making FDM printers popular among consumers. FDM 3D printing can be used to create a wide variety of objects, including prototypes, functional parts, works of art, etc. FDM 3D printing may be used to create objects that have complex geometries, the manufacturing of which would otherwise be difficult to carry out by using traditional manufacturing methods. FDM 3D printing finds applications in various fields, including microfluidics, microelectromechanical systems (MEMS), microscale robotics, and microscale components for electronics. It enables the creation of microfluidic channels, microneedles, microscale sensors, and intricate microstructures with high precision and complexity.

A FDM 3D printer includes, generally, a platform on which a desired 3D object can be built, an extruder, a filament feeding system configured to feed a filament to the extruder, a movable nozzle configured to receive heated filament from the extruder in flowable form and to direct the flowable filament on the platform for constructing the 3D object, one or more pieces of supporting material that aid the construction (e.g., printing) of the 3D object but are not part of the object, and a control circuit configured to control the process of discharging heated filament over the platform to create the intended 3D object. One of the problems with conventional FDM 3D printing technology is the difficulty in printing (e.g., discharging flowable filament material) in between two elevated structures that are separated from one another in order to connect the structure tops to one another with flowable filament material. This is because flowable filament material has fluid-like properties and therefore cannot support its own weight when laid horizontally in mid-air in between the elevated structures. Therefore, a supporting material (e.g., a block of material), conventionally, must be created to have a size and shape that fills a void (or empty space) between two elevated structures and must be placed in the void in order to create a bridge-like structure that can support the flowable filament while it is being discharged from the printing nozzle between the tops of the elevated structures. When the 3D object has been printed and cooled down, the supporting material can be disconnected from the structure in order to present the 3D structure in its intended configuration.

This process of custom-making a supporting structure for every project that requires connecting two or more elevated structure tops to one another is undesirable because it increases the manufacturing complexity, manufacturing cost and manufacturing time. In light of the above, a need remains for a system and a method of printing a three-dimensional (3D) object solving the aforementioned problems.

SUMMARY

The present subject matter relates generally to a three-dimensional (3D) printer system which, in one embodiment, includes a primary control unit; a build platform assembly comprising: a top build platform plate comprising a first surface, a second surface, and at least one through hole connecting the first surface to the second surface of the top build platform plate, wherein the first surface of the top build platform plate is configured for building a three-dimensional (3D) object thereon; a bottom build platform plate located beneath the top build platform plate; at least one support plate located between the top build platform plate and the bottom build platform plate, a length of the at least one support plate defining a separation space between the top build platform plate and the bottom build platform plate, and wherein the top build platform plate is connected to the bottom build platform plate via the at least one support plate; a pin assembly, located within the separation space, comprising at least one pin configured to pass through the second surface and the first surface of the top build platform plate via the at least one through hole; a primary controller assembly comprising: a primary motor comprising a primary sensor, the primary motor is configured to move the at least one pin in an x-axis direction; a secondary control unit attached to the primary motor and in communication with the primary control unit, the secondary control unit being configured to receive a first primary received signal or a second primary received signal from the primary control unit and to send a first primary sent signal or a second primary sent signal, respectively, to the primary sensor to activate the primary motor thereby moving the at least one pin in a first travel path or a second travel path, respectively, in the x-axis direction; and a movable nozzle in communication with the primary control unit, the movable nozzle being configured to receive a first quaternary sent signal from the primary control unit to extrude at least one extrudable material onto the first surface of the top build platform plate for creating the 3D object thereon.

In an embodiment, the primary controller assembly can further include a movable base comprising an upper channel member and a slotted lower member attached thereto. The slotted lower member can include a first slot. A first bearing can be located within the first slot. The primary motor can be electrically connected to the first bearing. An elongated plate can be attached to the secondary control unit and the movable base.

In another embodiment, the primary controller assembly can further include a motor base plate which can be attached to the upper channel member of the movable base. A second bearing and a third bearing can be located within a recess of the secondary control unit and the motor base plate, respectively. A threaded rotatable shaft can include a first portion and a second portion. The first portion and the second portion of the threaded rotatable shaft can be configured to reside within a recess of the second bearing and the third bearing, respectively. A secondary motor can include a secondary sensor. The secondary motor, which can be connected to the threaded rotatable shaft and located between the motor base plate and the secondary control unit, can be configured to rotate the threaded rotatable shaft.

In an additional embodiment, the primary controller assembly can further include a holder plate located between the secondary motor and the secondary control unit. The holder plate can be slidably attached to the elongated plate. The holder plate can include a through opening and a cavity. The threaded rotatable shaft can be threadedly engaged with the holder plate via the through opening. A rest base can be connected to the threaded rotatable shaft and can be located between the holder plate and the secondary motor. The rest base can be configured to limit a movement of the holder plate.

In a supplementary embodiment, the pin assembly can further include a pin support member which can be configured to hold the at least one pin. A support member rod can be attached to the pin support member. A portion of the support member rod can be configured to reside within the cavity of the holder plate.

In a further embodiment, the bottom build platform plate can further include a first channel and a second channel located at a first end and a second end of the bottom build platform plate, respectively. A first screw housing and a second screw housing can be located within the first channel and the second channel of the bottom build platform plate, respectively. A first threaded screw and a second threaded screw can be located within the first screw housing and the second screw housing, respectively.

In an embodiment, the system can further include a track assembly. The track assembly can include a longitudinal track extending a length of the bottom build platform plate. The longitudinal track can include an upper plate and a lower plate attached thereto. The lower plate can include a first inner bracket and a second inner bracket. The first inner bracket and the second inner bracket can be slidably attached to an outer first surface of the first screw housing and the second screw housing, respectively. The first inner bracket and the second inner bracket can include a second slot and a third slot, respectively. A third threaded screw can include a first end and a second end. The first end and the second end of the third threaded screw can be located within the second slot and the third slot, respectively. The upper channel member of the movable base can be configured to slidably attach to the upper plate of the longitudinal track. The slotted lower member of the movable base can be configured to threadedly engage with the third threaded screw via the first bearing.

In another embodiment, the activation of the primary motor can cause the first bearing within the first slot of the slotted lower member to rotate in a first direction or second direction thereby moving the at least one pin in the first travel path or the second travel path, respectively, in the x-axis direction via a movement of the movable base in the respective travel path.

In a further embodiment, the primary control unit can be further configured to send a first secondary sent signal or a second secondary sent signal to the secondary sensor of the secondary motor to activate the secondary motor thereby moving the at least one pin in a third travel path or a fourth travel path, respectively, in a z-axis direction via a movement of the holder plate in the respective travel path.

In an embodiment, the lower plate can further include a first outer bracket and a second outer bracket. The first outer bracket and the second outer bracket can be adjacent to the first inner bracket and the second inner bracket, respectively. The first outer bracket and the second outer bracket can be slidably attached to an outer second surface of the first screw housing and the second screw housing, respectively. A first slotted component and a second slotted component can be located within the first screw housing and the second screw housing, respectively. The first slotted component and the second slotted component can include a fourth slot and a fifth slot, respectively. A fourth bearing and a fifth bearing can be located within the fourth slot and the fifth slot, respectively, of the first slotted component and the second slotted component, respectively.

In another embodiment, the first slotted component and the second slotted component can be configured to threadedly engage with the first threaded screw and the second threaded screw, respectively, via the fourth bearing and the fifth bearing, respectively.

In an additional embodiment, the system can further include a tertiary motor comprising a tertiary sensor. The tertiary motor can be located above the first screw housing and attached to a first portion of the upper plate of the longitudinal track. A quaternary motor comprising a quaternary sensor. The quaternary motor can be located above the second screw housing and attached to a second portion of the upper plate of the longitudinal track. The tertiary motor and the quaternary motor can be electrically connected to the fourth bearing and the fifth bearing, respectively, within the fourth slot and fifth slot, respectively.

In a supplementary embodiment, the secondary control unit can further be configured to receive a first tertiary received signal or a second tertiary received signal from the primary control unit and to send a first tertiary sent signal or a second tertiary sent signal, respectively, to the tertiary sensor and quaternary sensor to activate the tertiary motor and the quaternary motor, respectively, thereby causing the fourth bearing and the fifth bearing within the fourth slot and the fifth slot, respectively, to rotate in a third direction or fourth direction.

In an embodiment, the step of rotating the fourth bearing and the fifth bearing in the third direction or the fourth direction can cause the track assembly to move in a fifth travel path or a sixth travel path, respectively, in a y-axis direction thereby moving the at least one pin in the respective travel path.

In a further embodiment, the present subject matter relates to a method of using the above system for printing a three-dimensional (3D) object, wherein the method includes receiving, via the primary control unit, instructions to print the 3D object; translating, via the primary control unit, the received instructions into a series of electrical signals; sending, via the primary control unit, the first primary received signal or the second primary received signal from the series of electrical signals to the secondary control unit, sending, via the secondary control unit, the first primary sent signal or the second primary sent signal, respectively, to the primary sensor, and activating, via the primary sensor, the primary motor to move the at least one pin in the first travel path or the second travel path, respectively, in the x-axis direction; and sending, via the primary control unit, the first quaternary sent signal from the series of electrical signals to the movable nozzle to cause the at least one extrudable material to be extruded therefrom onto the first surface of the top build platform plate thereby creating the 3D object thereon.

These and other features of the present subject matter will become readily apparent upon further review of the following specification.

DETAILED DESCRIPTION

Figure 1:
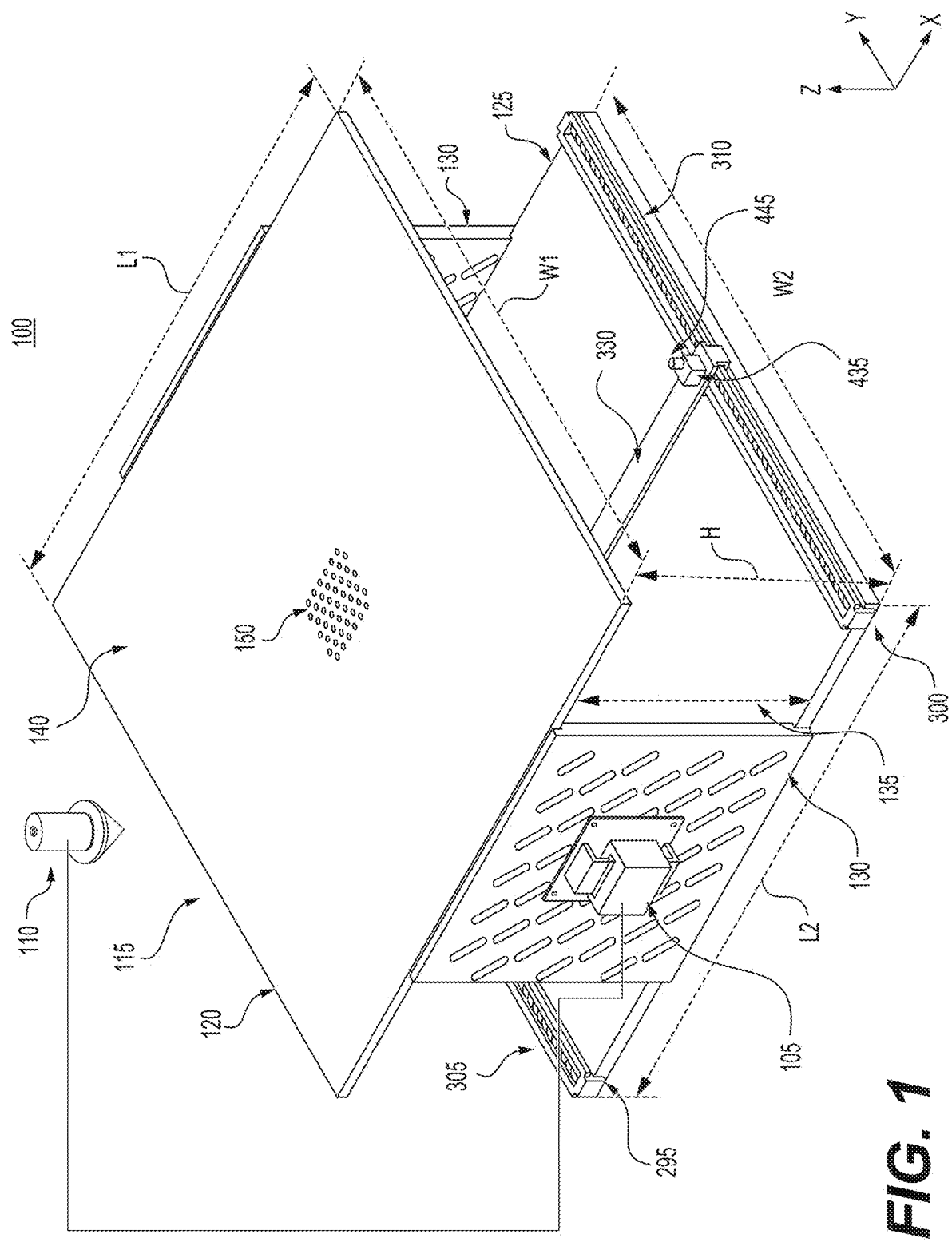
FIG. 1 is a perspective view of the system for printing a three-dimensional (3D) object.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that systems of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

FIGS. 1-9 depict, in an embodiment, a three-dimensional (3D) printer system 100 which can include a primary control unit 105, a movable nozzle 110, and a build platform assembly 115. In an embodiment, a digital 3D model can be generated using Computer-Aided Design (CAD) software. The CAD software can be AutoCAD®, SolidWorks®, Fusion 360, or any other suitable type of CAD software. The generated digital 3D model (in STL format, as a non-limiting example) can be converted into toolpath instructions (hereinafter referred as "instructions"), via a slicing software, that the 3D printer system 100 can use to build a 3D object, layer by layer. The slicing software can be Cura, PrusaSlicer, Simplify3D®, or any other suitable type of slicing software. The instructions can be in the form of a G-code file, as a non-limiting example. The G-code file, which is a machine language, can control the movements and actions of the three-dimensional (3D) printer system 100, as described herein.

In this regard, the primary control unit 105, which can include a microcontroller or a processor, can be configured to receive the instructions (e.g., as a G-code file) to print a 3D object as described herein. The primary control unit 105 can translate the received instructions (e.g., as a G-code file) into a series of electrical signals. Specifically, the microcontroller or the processor of the primary control unit 105 can run firmware to interpret the instructions (e.g., as a G-code file) and translate the instructions into a series of electrical signals. Afterwards, the primary control unit 105 can send the series of electrical signals to various components of the 3D printer system 100 to perform various tasks, as described herein.

The movable nozzle 110 (shown in FIGS. 1 and 9, for example) can be made of a metal and/or a ceramic material. The movable nozzle 110 can be configured for heating at least one extrudable material (not shown) in a molten form inside the movable nozzle 110. While a spool (for storing the at least one extrudable material), a feed roller (for feeding the at least one extrudable material into the nozzle from the spool), a gantry system (for moving the movable nozzle 110), and a heater (for heating the at least one extrudable material) are not shown in FIGS. 1-13, however these components are well known. It should be understood that any suitable type of 3D printing system, or the components therefor, may be used in combination with the present build platform assembly and nozzle. An example of such a system is shown in U.S. Patent Publication No. 2024/0327952 A1, which is hereby incorporated by reference in its entirety. In an embodiment, the steps of heating and loading the at least one extrudable material can be initiated by sending a signal(s) (from the series of electrical signals) from the primary control unit 105 to the movable nozzle 110, as described herein. Alternatively, as a non-limiting example, the at least one extrudable material can be heated in an extruder (not shown) in a molten form and then fed into the movable nozzle 110. According to this embodiment, the heater can be used to maintain a desired temperature of the molten extrudable material within the movable nozzle 110.

The at least one extrudable material can be a thermoplastic material. The thermoplastic material can include, for example, polylactic acid (PLA), acrylonitrile butadiene styrene (ABS), polyethylene terephthalate glycol (PETG), etc. Alternatively, or in addition, the at least one extrudable material can include a metal, a ceramic material, and/or micro-optimized material (e.g., carbon fiber reinforced polylactic acid, glass bead-filled nylon, graphene-enhanced polyethylene terephthalate glycol). As a non-limiting example, the at least one extrudable material is made of a thermoplastic material. In an embodiment, the at least one extrudable material can be in the form of a filament.

In an embodiment, the movable nozzle 110 can be in communication with the primary control unit 105. The primary control unit 105 can be configured to send a first quaternary sent signal from the series of electrical signals to the movable nozzle 110 to cause the latter to extrude the at least one extrudable material therefrom as described herein. The primary control unit 105 can also be configured to control the movable nozzle 110 to move in the x, y, and/or z axis directions via a signal from the series of electrical signals.

Figure 2:
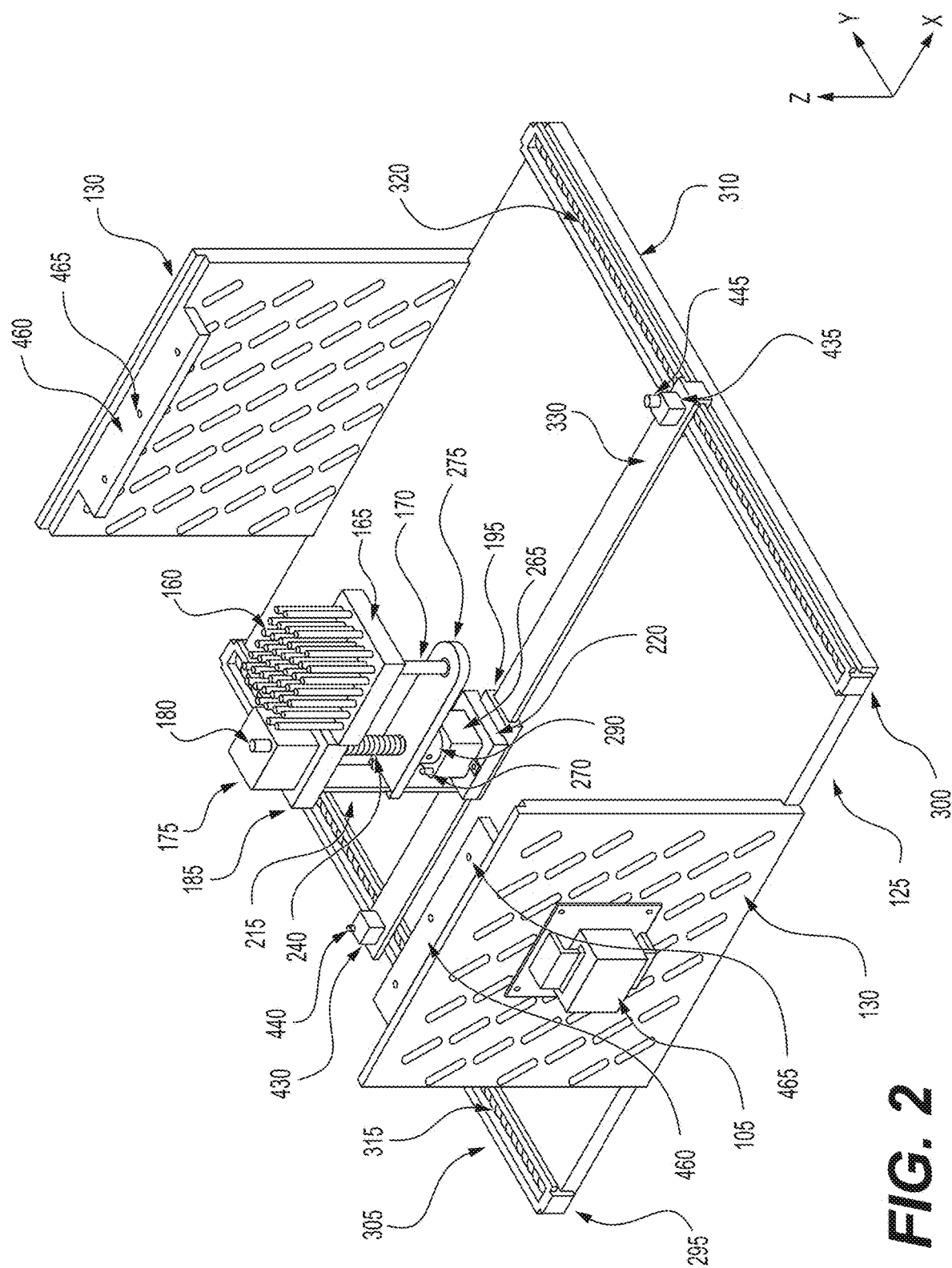
FIG. 2 is a partial perspective view of the system for printing a three-dimensional (3D) object.

As illustrated in FIGS. 1-2, the build platform assembly 115 can include a top build platform plate 120, a bottom build platform plate 125, and at least one support plate 130 located between the top build platform plate 120 and the bottom build platform plate 125. The at least one support plate 130 can connect the top build platform plate 120 to the bottom build platform plate 125 via connecting members 460. Each of the connecting members 460 can have a plurality of holes 465 configured for receiving a plurality of locking mechanisms (not shown) therein, thereby fastening the top build platform plate 120 and the bottom build platform plate 125 to the at least one support plate 130. The locking mechanisms may be, as non-limiting examples, screws, snap fit joints, heat-set inserts, other locking mechanisms, or a combination thereof. In another non-limiting embodiment, the top build platform plate 120 can have a dimension of about 30.00 cm in width (W1) and about 30.00 cm in length (L1), as seen in FIG. 1. Likewise, in a further non-limiting example, the bottom build platform plate 125 can have a dimension of about 30.00 cm in width (W2) and about 30.00 cm in length (L2). In certain non-limiting examples, the height (H) of the 3D printer system 100 can be about 15.00 cm. It should be understood that the dimension(s) (W1, L1, W2, L2, and/or H) of the 3D printer system 100 can be other sizes from those mentioned without departing from the spirit or scope of the present subject matter. In an embodiment, a length of the at least one support plate 130 can define a separation space 135 between the top build platform plate 120 and the bottom build platform plate 125 as indicated in FIG. 1. On one side of the at least one support plate 130, as depicted in FIG. 1, the primary control unit 105 can be mounted thereon.

Figure 9:
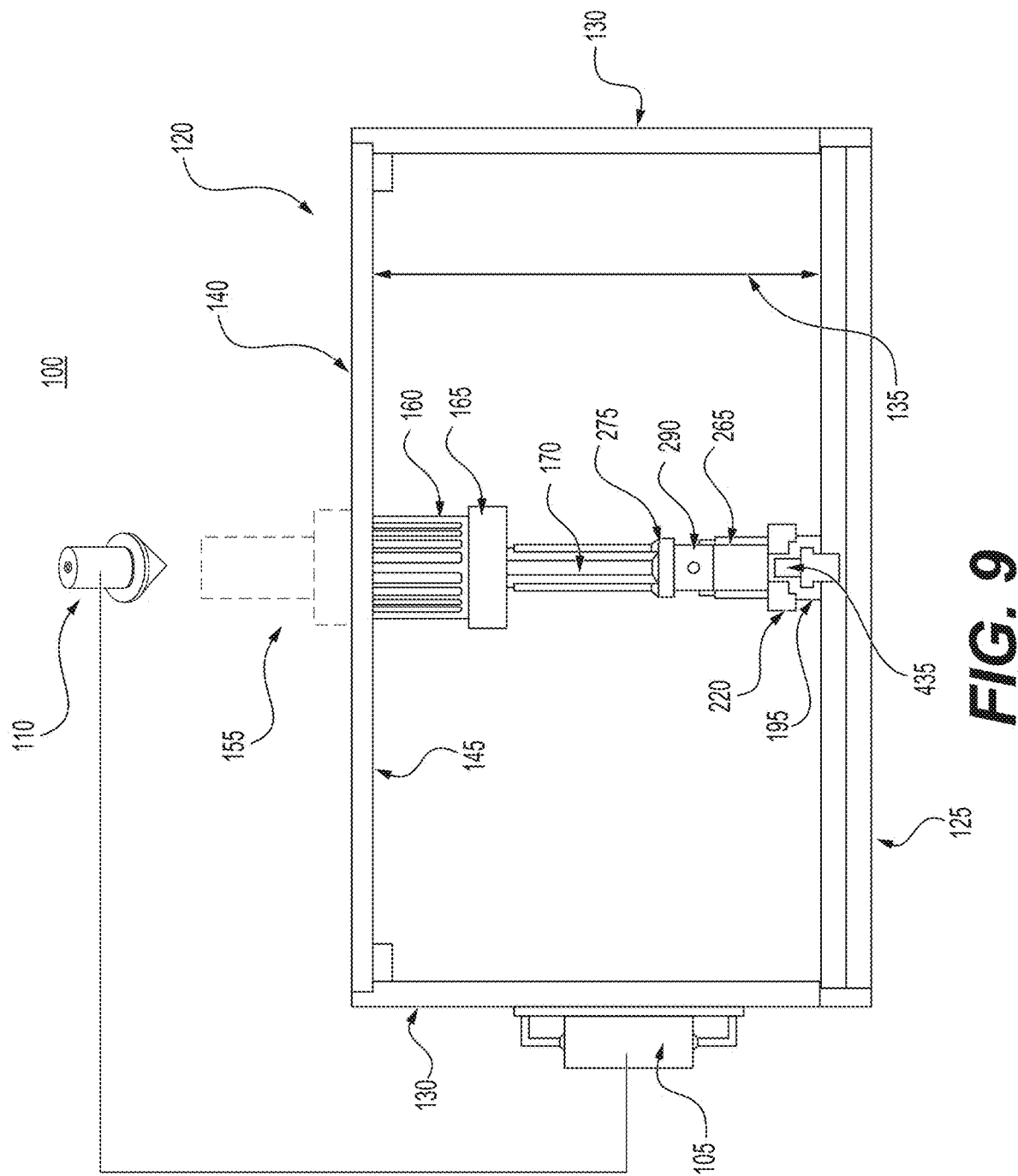
FIG. 9 is a side view of the system for printing a 3D object.

As shown in FIGS. 1 and 9, the top build platform plate 120 can include a first surface 140, a second surface 145, and at least one through hole 150 connecting the first surface 140 to the second surface 145 of the top build platform plate 120. The first surface 140 of the top build platform plate 120 can be configured for building a three-dimensional (3D) object 155 thereon using the movable nozzle 110 as described herein.

Figure 3:
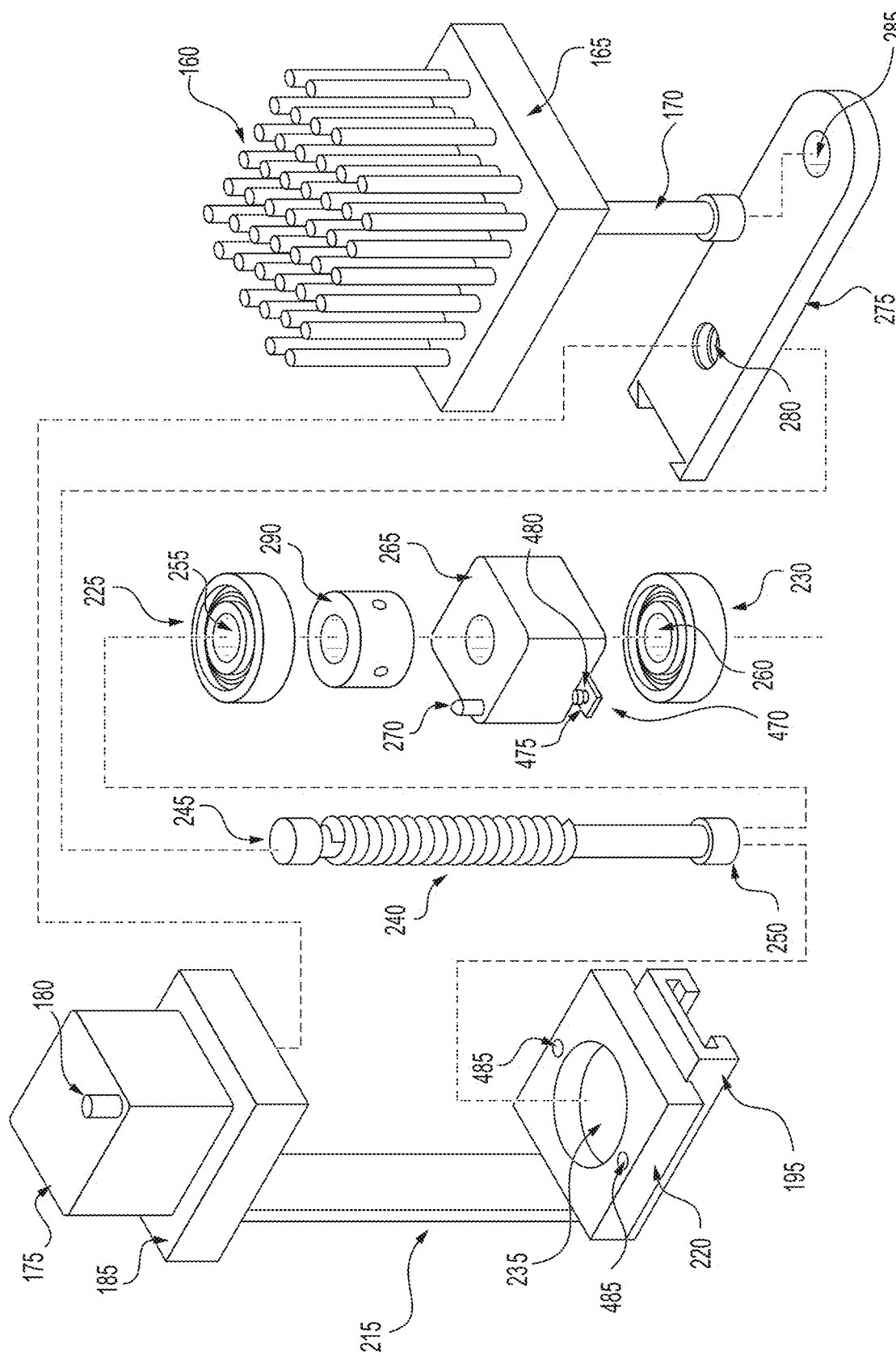
FIG. 3 is a partially exploded perspective view of a pin assembly and a primary controller assembly of the system for printing a three-dimensional (3D) object.

Located within the separation space 135 is a pin assembly. The pin assembly can include at least one pin 160, which can be configured to pass through the second surface 145 and the first surface 140 of the top build platform plate 120 via the at least one through hole 150 as depicted in FIGS. 1-3. It should be understood that the number of the at least one pin 160 can be more or less than those shown in at least FIG. 2 without departing from the present subject matter. In this context, the number of the at least one through hole 150 of the top build platform plate 120, as illustrated in FIG. 1, can be more or less corresponding to the number of the at least one pin 160. The at least one pin 160 can be coated with a releasing agent. The releasing agent can prevent the at least one extrudable material from the movable nozzle 110 from bonding too strongly to the at least one pin 160 during fabrication of the 3D object 155 as described herein. In this aspect, the formed 3D object 155 can be easily released from the at least one pin 160 after fabrication, thereby preventing damage to the former. The releasing agent may be, as non-limiting examples, silicone-based materials (e.g., polydimethylsiloxane, silicone oils, silicone greases, cross-linked silicone elastomers), fluoropolymer materials (e.g., polytetrafluoroethylene, perfluoroalkoxy alkane, fluorinated ethylene propylene, ethylene tetrafluoroethylene), other releasing agents, or a combination thereof.

In an embodiment, the pin assembly can also include a pin support member 165, which can be configured to hold the at least one pin 160. Attached to a surface of the pin support member 165 is a support member rod 170. Also located within the separation space 135 is a primary controller assembly. The primary controller assembly can include a primary motor 175 as indicated in FIGS. 2-3. The primary motor 175 can include a primary sensor 180. The primary motor 175 can be configured to move the at least one pin 160 in an x-axis direction as described herein.

The primary controller assembly can further include a secondary control unit 185 as depicted in FIGS. 2-3. The secondary control unit 185 can be attached to the primary motor 175 and in communication with the primary control unit 105. The secondary control unit 185 can be configured to receive a first primary received signal or a second primary received signal from the series of electrical signals from the primary control unit 105. Once the first primary received signal or the second primary received signal is received, the secondary control unit 185 can send a first primary sent signal or a second primary sent signal, respectively, to the primary sensor 180 to activate the primary motor 175, thereby moving the at least one pin 160 in a first travel path (towards the right in the x-axis direction as shown in FIG. 2) or a second travel path (towards the left in the x-axis direction as shown in FIG. 2), respectively, in the x-axis direction as described herein. In another non-limiting embodiment, the first primary received signal or the second primary received signal can be the same as the first primary sent signal or the second primary sent signal, respectively. Alternatively, the first primary received signal or the second primary received signal can be different from the first primary sent signal or the second primary sent signal, respectively.

In an embodiment, the primary control unit 105 can be configured to send a third primary received signal (from the series of electrical signals) to the secondary control unit 185. Once the third primary received signal is received, the secondary control unit 185 can send a third primary sent signal to the primary sensor 180 to stop the primary motor 175, thereby ceasing the movement of the at least one pin 160 in the first travel path and the second travel path. In a particular non-limiting embodiment, the third primary received signal can be the same as the third primary sent signal. Alternatively, the third primary received signal can be different from the third primary sent signal.

As shown in FIGS. 2-5, the primary controller assembly can further include a movable base 190 comprising an upper channel member 195 and a slotted lower member 200 attached thereto. The slotted lower member 200 can include a first slot 205. In an embodiment, a first bearing 210 can be located within the first slot 205.

Figure 4:
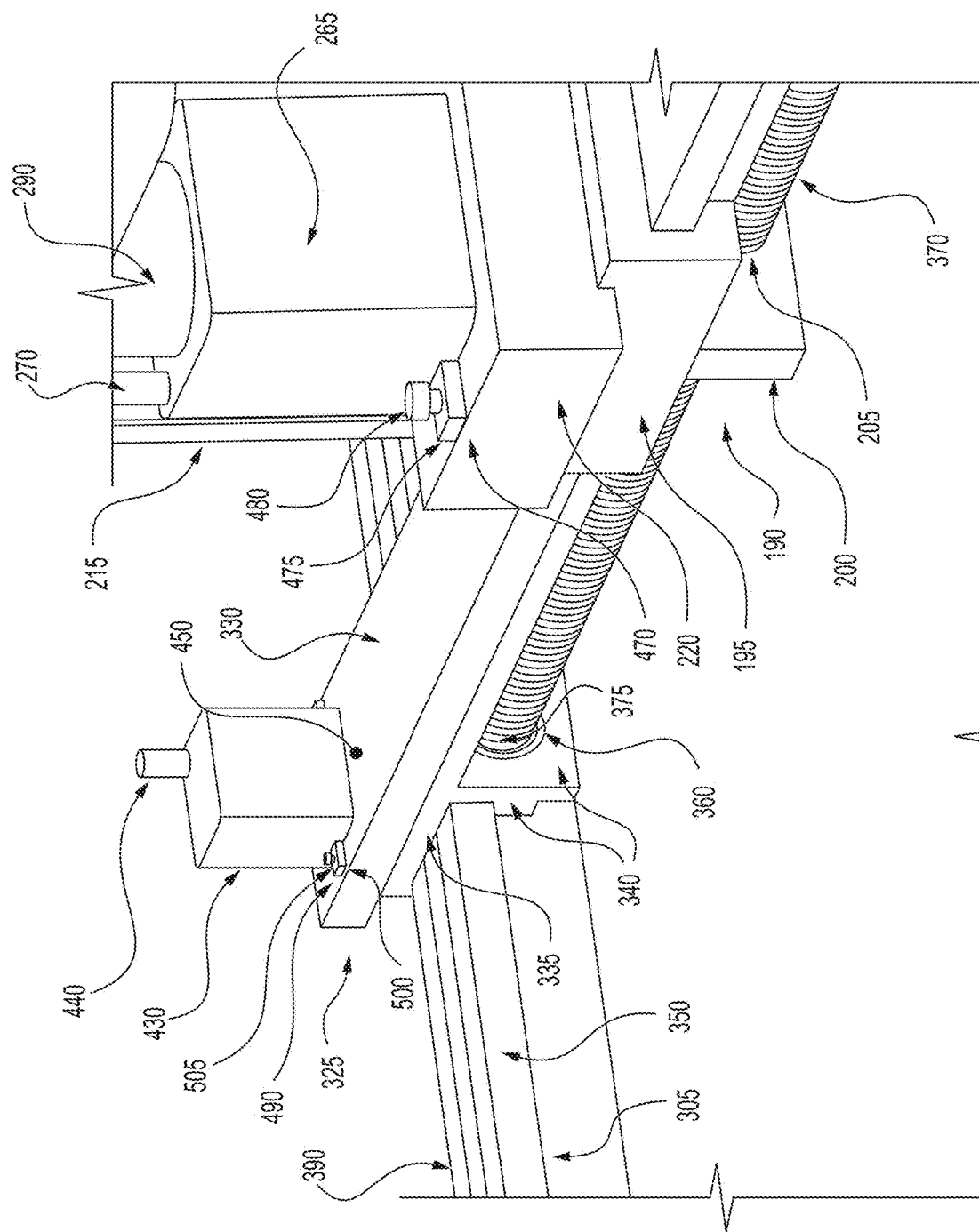
FIG. 4 is a perspective view of a track assembly and a portion of the primary controller assembly of the system for printing a three-dimensional (3D) object.

As illustrated in FIGS. 2-4, the primary controller assembly can further include an elongated plate 215. The elongated plate 215 can be directly or indirectly attached to the secondary control unit 185 and the movable base 190. The primary controller assembly can further include a motor base plate 220 which can be attached to the upper channel member 195 of the movable base 190 as depicted in FIGS. 2-4. In an embodiment, a second bearing 225 and a third bearing 230 can be located within a recess (not shown) of the secondary control unit 185 and a recess 235 of the motor base plate 220, respectively. According to an embodiment, a threaded rotatable shaft 240 can include a first portion 245 and a second portion 250, as seen in FIG. 3. The first portion 245 and the second portion 250 of the threaded rotatable shaft 240 can be configured to reside within a recess 255 of the second bearing 225 and a recess 260 of the third bearing 230, respectively. In this respect, the second bearing 225 and the third bearing 230 can provide smooth and stable rotation of the threaded rotatable shaft 240, as described herein, including preventing misalignment and/or wobbling thereof.

The primary controller assembly can further include a secondary motor 265 as indicated in FIG. 2-3. The secondary motor 265 can be attached to the motor base plate 220 via at least one fastening member 470. The fastening member 470 may be similar to the one shown in FIGS. 3-4 that is located on the opposite side of the secondary motor 265. Each of the at least one fastening member 470 can include a first screw plate 475 and a first screw 480. Corresponding to this embodiment, each of the at least one fastening member 470 can be configured to fasten to each of at least one opening 485 via the respective first screw 480, thereby fastening the secondary motor 265 to the motor base plate 220.

In an embodiment, the secondary motor 265 can include a secondary sensor 270, as depicted in FIGS. 2-3. The secondary motor 265, which can be mechanically connected (via fasteners or attachments) to the threaded rotatable shaft 240 and located between the motor base plate 220 and the secondary control unit 185 can be configured to rotate the threaded rotatable shaft 240.

As shown in FIG. 2, the primary controller assembly can further include a holder plate 275. The holder plate 275 can be located between the secondary motor 265 and the secondary control unit 185. The holder plate 275 can be slidably attached to the elongated plate 215. In this aspect, the holder plate 275 can be stabilized by the elongated plate 215 during its movement, as described herein. The holder plate 275 can include a through opening 280 and a cavity 285, as shown in FIGS. 2-3. The threaded rotatable shaft 240 can be threadedly engaged with the holder plate 275 via the through opening 280. A portion of the support member rod 170 can be configured to reside within the cavity 285 of the holder plate 275. In this respect, as the holder plate 275 moves, the at least one pin 160 moves correspondingly, as described herein.

As illustrated in FIGS. 2-3, the primary controller assembly can further include a rest base 290. The rest base 290 can be connected to the threaded rotatable shaft 240 and located between the holder plate 275 and the secondary motor 265. The rest base 290 can be configured to limit a downward vertical movement of the holder plate 275, as described herein. The rest base 290 can also be configured to provide a home position for the holder plate 275 after fabrication of the 3D object 155.

In an embodiment, the movement of the holder plate 275 can be actuated by the rotation of the threaded rotatable shaft 240 via the secondary motor 265 as described supra. Specifically, the primary control unit 105 can be configured to send a first secondary sent signal or a second secondary sent signal (from the series of electrical signals) to the secondary sensor 270 of the secondary motor 265 to activate the secondary motor 265. The activation of the secondary motor 265 can cause the threaded rotatable shaft 240 to rotate clockwise (via the first secondary sent signal) or counterclockwise (via the second secondary sent signal). As the threaded rotatable shaft 240 rotates clockwise or counterclockwise, the holder plate 275 can move in a third travel path (upward vertical motion in a z-axis direction) or a fourth travel path (downward vertical motion in a z-axis direction), respectively, in a z-axis direction. The movement of the holder plate 275 in the third travel path or the fourth travel path can also cause the at least pin 160 to move in the same travel path. In the case when the holder plate 275 is moving in the fourth travel path, the extent of the movement can be limited by the rest base 290 to prevent damage to the secondary motor 265.

In an embodiment, the primary control unit 105 can be configured to send a third secondary sent signal (from the series of electrical signals) to the secondary sensor 270 of the secondary motor 265 to stop the secondary motor 265, which in turn prevents rotation of the threaded rotatable shaft 240. Corresponding to this embodiment, the movement of the holder plate 275 and the at least one pin 160 in the third travel path and the fourth travel path can cease.

As seen in FIGS. 1-2, the bottom build platform plate 125 can include a first channel 295 and a second channel 300 located at a first end and a second end of the bottom build platform plate 125, respectively. A first screw housing 305 and a second screw housing 310 can be located within the first channel 295 and the second channel 300 of the bottom build platform plate 125, respectively. A first threaded screw 315 and a second threaded screw 320 can be located within the first screw housing 305 and the second screw housing 310, respectively.

Figure 6:
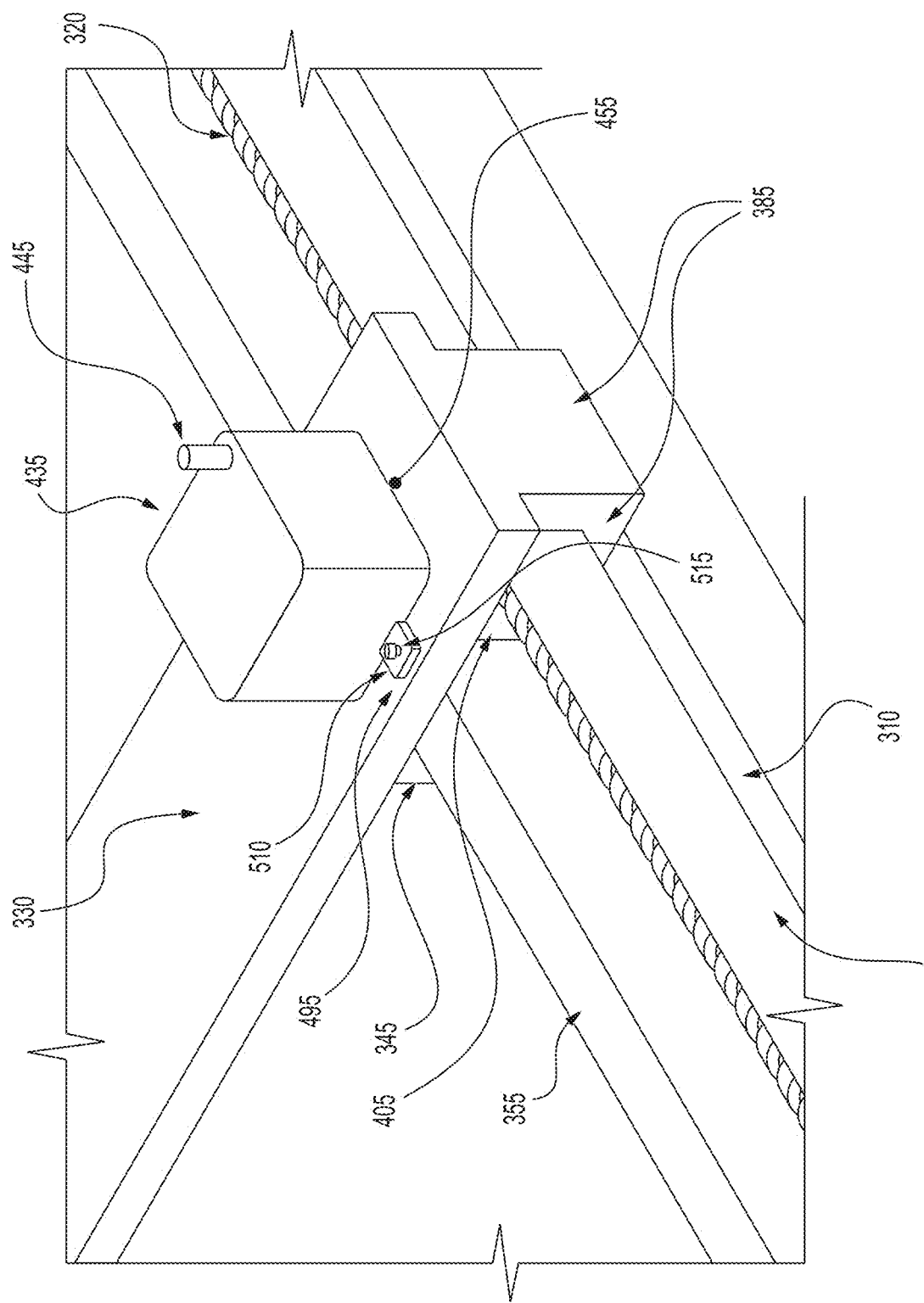
FIG. 6 is a partial perspective view of the track assembly, including a portion of a bottom build platform plate and a quaternary motor.
Figure 7:
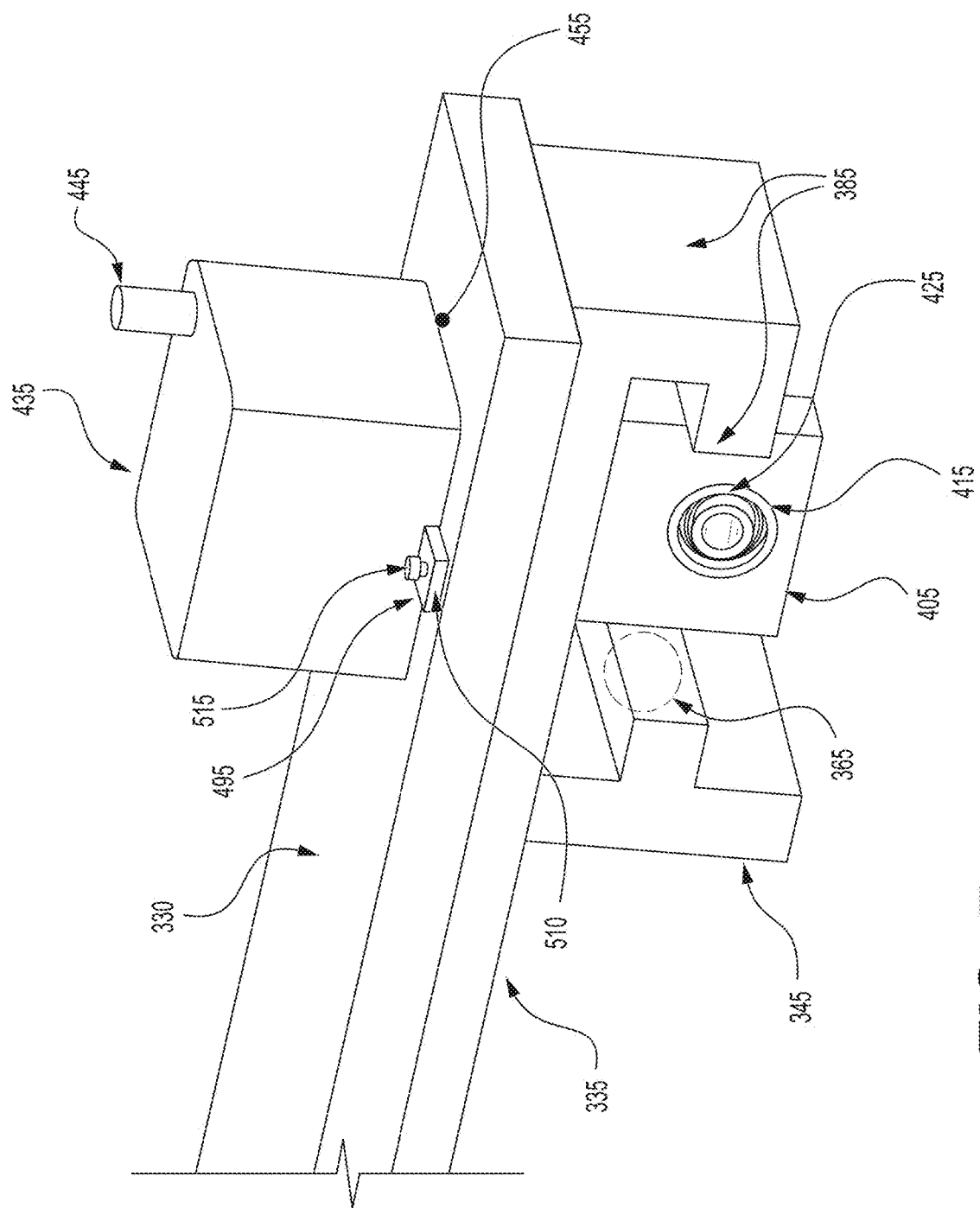
FIG. 7 is a partial perspective view of the track assembly, including the quaternary motor.
Figure 8:
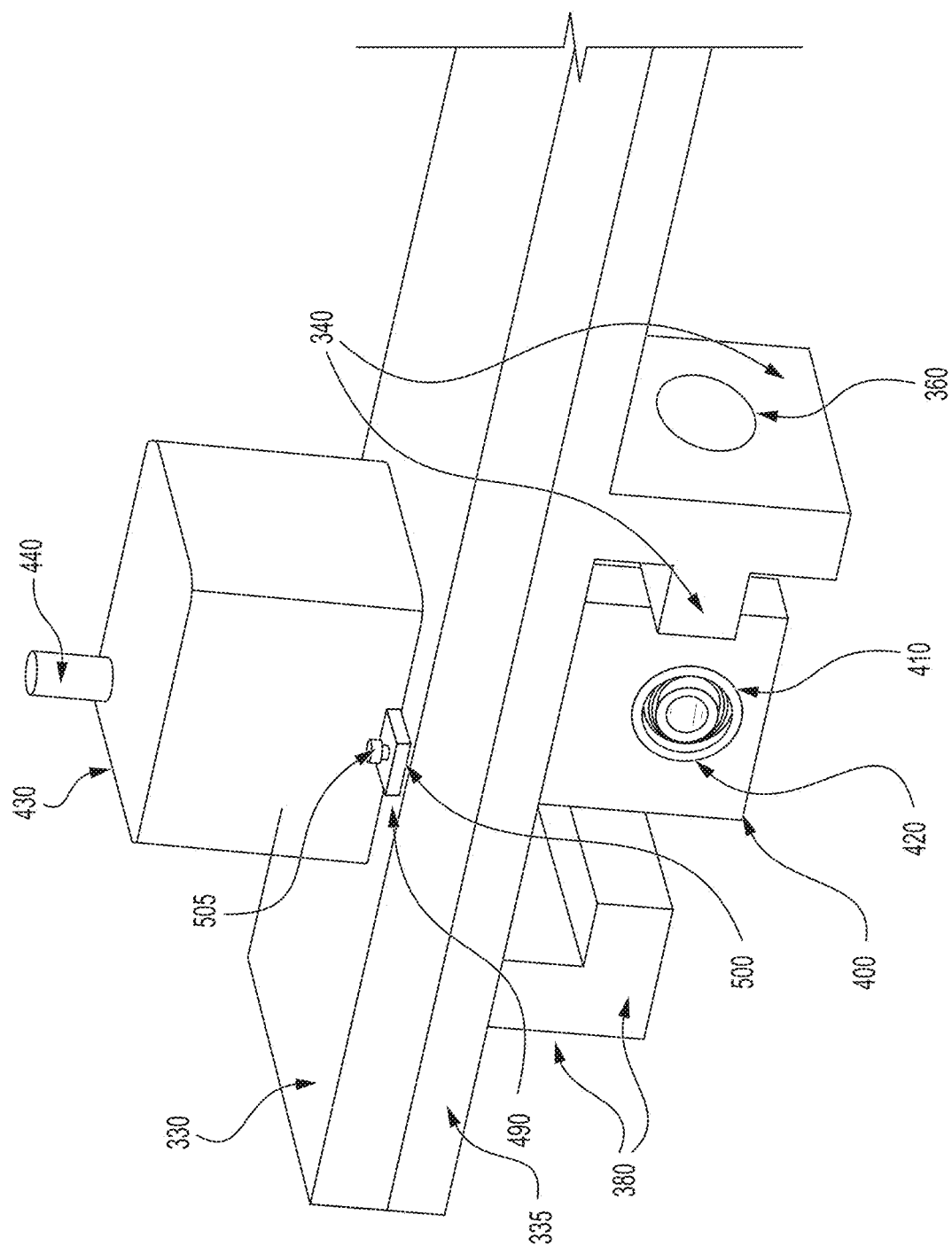
FIG. 8 is a partial perspective view of the track assembly, including a tertiary motor.

The 3D printer system 100 can further include a track assembly. The track assembly can include a longitudinal track 325 extending a length of the bottom build platform plate 125, as indicated in FIGS. 1-2 and 4. The longitudinal track 325 can include an upper plate 330 and a lower plate 335 attached thereto. The lower plate 335 can include a first inner bracket 340 and a second inner bracket 345, as depicted in FIGS. 4 and 6-8. As shown in FIGS. 4 and 6, the first inner bracket 340 and the second inner bracket 345 can be slidably attached to an outer first surface 350 of the first screw housing 305 and an outer first surface 355 of the second screw housing 310, respectively. The first inner bracket 340 and the second inner bracket 345, as illustrated in FIGS. 4 and 7-8, can include a second slot 360 and a third slot 365 (It should be noted that the third slot 365 is located only on the portion of the second inner bracket 345 facing directly at numeral reference 335 as shown in FIG. 7), respectively.

The track assembly can further include a third threaded screw 370, as seen in FIG. 4. The third threaded screw 370 can include a first end 375 and a second end. The first end 375 and the second end of the third threaded screw 370 can be located within the second slot 360 and the third slot 365, respectively. It should be noted that although the second end of the third threaded screw 370 is not shown, the third threaded screw 370 inherently has a second end that is located within the third slot 365 of the second inner bracket 345, as shown in FIG. 7.

Figure 5:
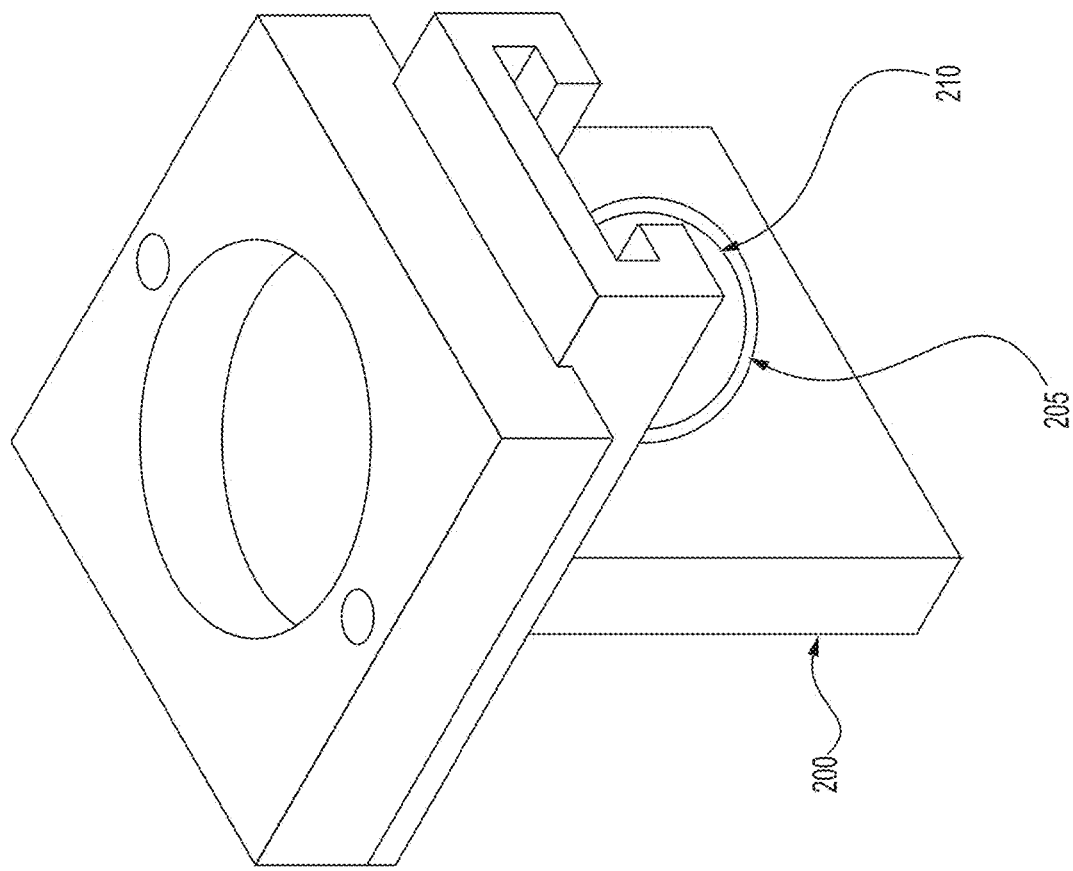
FIG. 5 is a perspective view of a slotted lower member of the system for printing a three-dimensional (3D) object.

Referring back to the movable base 190, the upper channel member 195 of the movable base 190 can be configured to slidably attach to the upper plate 330 of the longitudinal track 325, as indicated in FIG. 4. Likewise, the slotted lower member 200 of the movable base 190 can be configured to threadedly engage with the third threaded screw 370 via the first bearing 210 as depicted in FIGS. 4-5. According to these embodiments, the activation of the primary motor 175 (via the primary sensor 180, as discussed supra) can cause the first bearing 210 within the first slot 205 of the slotted lower member 200 to rotate in a first direction (rotate clockwise via the first primary sent signal) or a second direction (rotate counterclockwise via the second primary sent signal) thereby rotating the third threaded screw 370 in the same respective direction, which results in the movable base 190 moving in the first travel path (towards the right in the x-axis direction as shown in FIG. 2) or the second travel path (towards the left in the x-axis direction as shown in FIG. 2), respectively, in the x-axis direction. In this context, as the movable base 190 moves in the first travel path or the second travel path, the entire primary controller assembly (including the elongated plate 215 and holder plate 275) and the entire pin assembly (including the at least one pin 160) can move in the same respective travel path.

Referring back to the lower plate 335 of the longitudinal track 325, the lower plate 335 can further include a first outer bracket 380 and a second outer bracket 385 as shown in FIGS. 6-8. The first outer bracket 380 and the second outer bracket 385 can be adjacent to the first inner bracket 340 and the second inner bracket 345, respectively. As illustrated in FIGS. 4 and 6-8, the first outer bracket 380 and the second outer bracket 385 can be slidably attached to an outer second surface 390 of the first screw housing 305 and an outer second surface 395 of the second screw housing 310, respectively.

The lower plate 335 can further include a first slotted component 400 and a second slotted component 405, as seen in FIGS. 6-8. The first slotted component 400 and the second slotted component 405 can be located within the first screw housing 305 and the second screw housing 310, respectively. The first slotted component 400 and the second slotted component 405 can include a fourth slot 410 and a fifth slot 415, respectively. A fourth bearing 420 and a fifth bearing 425 can be located within the fourth slot 410 and the fifth slot 415, respectively, of the first slotted component 400 and the second slotted component 405, respectively. As indicated in FIGS. 2 and 6-8, the first slotted component 400 and the second slotted component 405 can be configured to threadedly engage with the first threaded screw 315 and the second threaded screw 320, respectively, via the fourth bearing 420 and the fifth bearing 425, respectively.

As depicted in FIGS. 2, 4, and 6-8, the 3D printer system 100 can further include a tertiary motor 430 and a quaternary motor 435. The tertiary motor 430 and the quaternary motor 435 can include a tertiary sensor 440 and a quaternary sensor 445, respectively. The tertiary motor 430 and the quaternary motor 435 can be located above the first screw housing 305 and the second screw housing 310, respectively, and attached to a first portion 450 and a second portion 455, respectively, of the upper plate 330 of the longitudinal track 325 via at least one first fastening component 490 and at least one second fastening component 495 (there is a first fastening component 490 and a second fastening component 495 similar to the ones shown in FIGS. 4 and 6-8 that are located on the opposite side of the tertiary motor 430 and the quaternary motor 435, respectively), respectively. Each of the at least one first fastening component 490 and the at least one second fastening component 495 can include (a second screw plate 500 and a second screw 505) and (a third screw plate 510 and a third screw 515), respectively. According to this embodiment, each of the at least one first fastening component 490 and the at least one second fastening component 495 can be configured to fasten to the first portion 450 and the second portion 455, respectively, of the upper plate 330 via the respective screws, thereby fastening the tertiary motor 430 and the quaternary motor 435 to the upper plate 330. While not shown in FIGS. 4 and 6-8, there are a plurality of openings, similar to the openings 485 in FIG. 3, at about the first portion 450 and the second portion 455 of the upper plate 330 for the second screw 505 and the third screw 515 to fasten to, respectively. In an embodiment, the tertiary motor 430 and the quaternary motor 435 can be electrically connected to the fourth bearing 420 and the fifth bearing 425, respectively, within the fourth slot 410 and fifth slot 415, respectively.

In an embodiment, the secondary control unit 185 can be further configured to receive a first tertiary received signal or a second tertiary received signal (from the series of electrical signals) from the primary control unit 105. Once the first tertiary received signal or the second tertiary received signal is received, the secondary control unit 185 can send a first tertiary sent signal or a second tertiary sent signal, respectively, to the tertiary sensor 440 and the quaternary sensor 445 to activate the tertiary motor 430 and the quaternary motor 435, respectively, thereby causing the fourth bearing 420 and the fifth bearing 425 within the fourth slot 410 and the fifth slot 415, respectively, to rotate in a third direction (clockwise direction via the first tertiary sent signal) or a fourth direction (counterclockwise direction via the second tertiary sent signal). The rotation of the fourth bearing 420 and the fifth bearing 425 in the third direction or the fourth direction can cause the first threaded screw 315 and the second threaded screw 320, respectively, to rotate in the same respective direction, which results in the track assembly 325 (see FIG. 4) moving in a fifth travel path (into the page as shown at least in FIG. 2) or a sixth travel path (out of the page as shown at least in FIG. 2), respectively, in a y-axis direction. As the track assembly 325 moves in the fifth travel path or the sixth travel path, the entire primary controller assembly (including the elongated plate 215 and holder plate 275) and the entire pin assembly (including the at least one pin 160) can move in the same respective travel path. In some non-limiting embodiments, the first tertiary received signal or the second tertiary received signal can be the same as the first tertiary sent signal or the second tertiary sent signal, respectively. Alternatively, the first tertiary received signal or the second tertiary received signal can different from the first tertiary sent signal or the second tertiary sent signal, respectively.

In an embodiment, the primary control unit 105 can be configured to send a third tertiary received signal (from the series of electrical signals) to the secondary control unit 185. Once the third tertiary received signal is received, the secondary control unit 180 can send a third tertiary sent signal to the tertiary sensor 440 and the quaternary sensor 445 to stop the tertiary motor 430 and the quaternary motor 435, respectively. As a result, movement of the track assembly 325, the entire primary controller assembly (including the elongated plate 215 and holder plate 275), and the entire pin assembly (including the at least one pin 160) in the fifth travel path and the sixth travel path can be ceased. In some non-limiting embodiments, the third tertiary received signal can be the same as the third tertiary sent signal. Alternatively, the third tertiary received signal can be different from the third tertiary sent signal.

It should be understood, depending where the at least one pin 160 is located with respect to the at least one through hole 150, that the movement of the at least one pin 160 in the x-axis direction (via the first travel path or the second travel path), the z-axis direction (via the third travel path or the fourth travel path), and the y-axis direction (via the fifth travel path or the sixth travel path) can move in any order and can be consecutively or concurrently moving with respect to the other directions without departing from the present subject matter. Additionally or alternatively, movement of the at least one pin 160 can occur in one or more of the mentioned axis directions. For example, the at least one pin 160 can move only in the z-axis direction, the x-axis/z-axis directions, the y-axis/z-axis directions, or the x-axis/y-axis/z-axis directions.

First Embodiment of the Printing Process

In a further embodiment, the present subject matter relates to a method of using the above 3D printer system 100 for printing a 3D object 155, as shown in FIGS. 1-9. The method can include receiving, via the primary control unit 105, instructions (e.g., a G-code file) to print the 3D object 155 (Step 1). Then, the primary control unit 105 can translate the received instructions into a series of electrical signals (Step 2).

Next, the primary control unit 105 can send a first signal (from the series of electrical signals) to the movable nozzle 110 to load the at least one extrudable material into the movable nozzle 110 (Step 3). Afterward, the primary control unit 105 can send a second signal (from the series of electrical signals) to the movable nozzle 110 to heat, via the heater, the at least one extrudable material within the movable nozzle 110 to a desired temperature to melt the at least one extrudable material (Step 4). Thereafter, the primary control unit 105 can send a third signal (from the series of electrical signals) to the movable nozzle 110 to move the latter above the at least one through hole 150 of the first surface 140 of the top build platform plate 120 (Step 5). Alternatively, as a non-limiting example, the step of moving the movable nozzle 110, including the steps of loading and heating the at least one extrudable material, can be performed by sending a single signal (from the series of electrical signals) from the primary control unit 105 to the movable nozzle 110 (Alternative Steps 3-5).

Subsequently, the primary control unit 105 can send a first primary received signal or a second primary received signal from the series of electrical signals to the secondary control unit 185 (Step 6). Once the first primary received signal or the second primary received signal is received, the secondary control unit 185 can send a first primary sent signal or a second primary sent signal, respectively, to the primary sensor 180 to activate the primary motor 175 to cause the first bearing 210 within the first slot 205 of the slotted lower member 200 to rotate in a first direction (rotate clockwise via the first primary sent signal) or a second direction (rotate counterclockwise via the second primary sent signal). Rotating in the first direction or the second direction will depend on where the at least one pin 160 is located in the x-axis direction with respect to the at least one through hole 150 of the top build platform plate 120 at the outset of the fabrication. This results in rotating the third threaded screw 370 in the same respective direction, which results in the movable base 190 moving in a first travel path (towards the right in the x-axis direction as shown in FIG. 2) or a second travel path (towards the left in the x-axis direction as shown in FIG. 2), respectively, in an x-axis direction (Step 7). As the movable base 190 is moving, simultaneously moving the entire primary controller assembly (including the elongated plate 215 and holder plate 275) and the entire pin assembly (including the at least one pin 160) in the same respective travel path as the movable base 190 (Step 8). Alternatively, as another non-limiting embodiment, Steps 6-8 can occur concurrently with Steps 3-5 or Alternative Steps 3-5.

Following the above, the primary control unit 105 can send a first tertiary received signal or a second tertiary received signal (from the series of electrical signals) to the secondary control unit 185 (Step 9). Once the first tertiary received signal or the second tertiary received signal is received, the secondary control unit 185 can send a first tertiary sent signal or a second tertiary sent signal, respectively, to the tertiary sensor 440 and the quaternary sensor 445 to activate the tertiary motor 430 and the quaternary motor 435, respectively, to cause the fourth bearing 420 and the fifth bearing 425 within the fourth slot 410 and the fifth slot 415, respectively, to rotate in a third direction (clockwise direction via the first tertiary sent signal) or a fourth direction (counterclockwise direction via the second tertiary sent signal). Rotating in the third direction or the fourth direction will depend on where the at least one pin 160 is located in the y-axis direction with respect to the at least one through hole 150 of the top build platform plate 120 at the outset of the fabrication. This results in rotating the first threaded screw 315 and the second threaded screw 320, respectively, in the same respective direction which results in the track assembly 325 moving in a fifth travel path (into the page as shown at least in FIG. 2) or a sixth travel path (out of the page as shown at least in FIG. 2), respectively, in a y-axis direction (Step 10). As the track assembly 325 is moving, there is simultaneous movement of the entire primary controller assembly (including the elongated plate 215 and holder plate 275) and the entire pin assembly (including the at least one pin 160) in the same respective travel path as the track assembly 325 (Step 11). Alternatively, as a non-limiting embodiment, Steps 9-11 can occur concurrently with Steps 3-5 or Alternative Steps 3-5 or Steps 6-8 or (Steps 3-5 and Steps 6-8) or (Alternative Steps 3-5 and Steps 6-8).

Following the above, the tertiary sensor 440 and/or the quaternary sensor 445 of the tertiary motor 430 and the quaternary motor 435, respectively, can detect if the at least one pin 160 is directly under and away from the at least one through hole 150 of the top build platform plate 120. If the detection is valid (i.e., the at least one pin 160 is directly under and away from the at least one through hole 150), the tertiary sensor 440 and/or the quaternary sensor 445 can send a signal(s) to the primary control unit 105 to confirm the valid detection (Step 12). Conversely, if the detection is not valid (i.e., the at least one pin 160 is not directly under and away from the at least one through hole 150), Steps 6-8 and/or Steps 9-11 can be repeated until the at least one pin 160 is directly under and away from the at least one through hole 150 of the top build platform plate 120. After which, Step 12 can be repeated.

Next, the primary control unit 105 can send a first secondary sent signal (from the series of electrical signals), after confirming the valid detection via the primary control unit 105, to the secondary sensor 270 of the secondary motor 265 to activate the secondary motor 265 to cause the threaded rotatable shaft 240 to rotate clockwise (via the first secondary sent signal), thereby moving the holder plate 275 in a third travel path (upward vertical motion in a z-axis direction) in a z-axis direction (Step 13). As the holder plate 275 is moving, the at least one pin 160 simultaneously moves in the same third travel path as the holder plate 275 (Step 14).

As the at least one pin 160 moves through the at least one through hole 150 of the top surface 140 of the top build platform plate 120, the primary control unit 105 can send a first quaternary sent signal from the series of electrical signals to the movable nozzle 110 to cause the molten at least one extrudable material to be extruded from the movable nozzle 110 onto the at least one pin 160 and the first surface 140 of the top build platform plate 120 thereby creating the 3D object 155 thereon (Step 15).

After fabrication of the 3D object 155 is complete, the primary control unit 105 can send a second quaternary sent signal (from the series of electrical signals) to the movable nozzle 110 to stop the extrusion of the molten at least one extrudable material (Step 16). Concurrently, the primary control unit 105 can send a second secondary sent signal (from the series of electrical signals) to the secondary sensor 270 of the secondary motor 265 to activate the secondary motor 265 to cause the threaded rotatable shaft 240 to rotate counterclockwise (via the second secondary sent signal) thereby moving the holder plate 275 in a fourth travel path (downward vertical motion in a z-axis direction) in a z-axis direction (Step 17). As the holder plate 275 is moving, simultaneously moving the at least pin 160 in the same fourth travel path as the holder plate 275 to withdraw the at least pin 160 from the at least one through hole 150 of the top build platform plate 120 (Step 18). Continue moving the holder plate 275 in the fourth travel path in the z-axis direction until the holder plate 275 touches the rest base 290 (Step 19). At this point, the primary control unit 105 can send a third secondary sent signal (from the series of electrical signals) to the secondary sensor 270 of the secondary motor 265 to stop the secondary motor 265, which in turn prevents rotation of the threaded rotatable shaft 240 (Step 20).

Second Embodiment of the Printing Process

Figure 10:
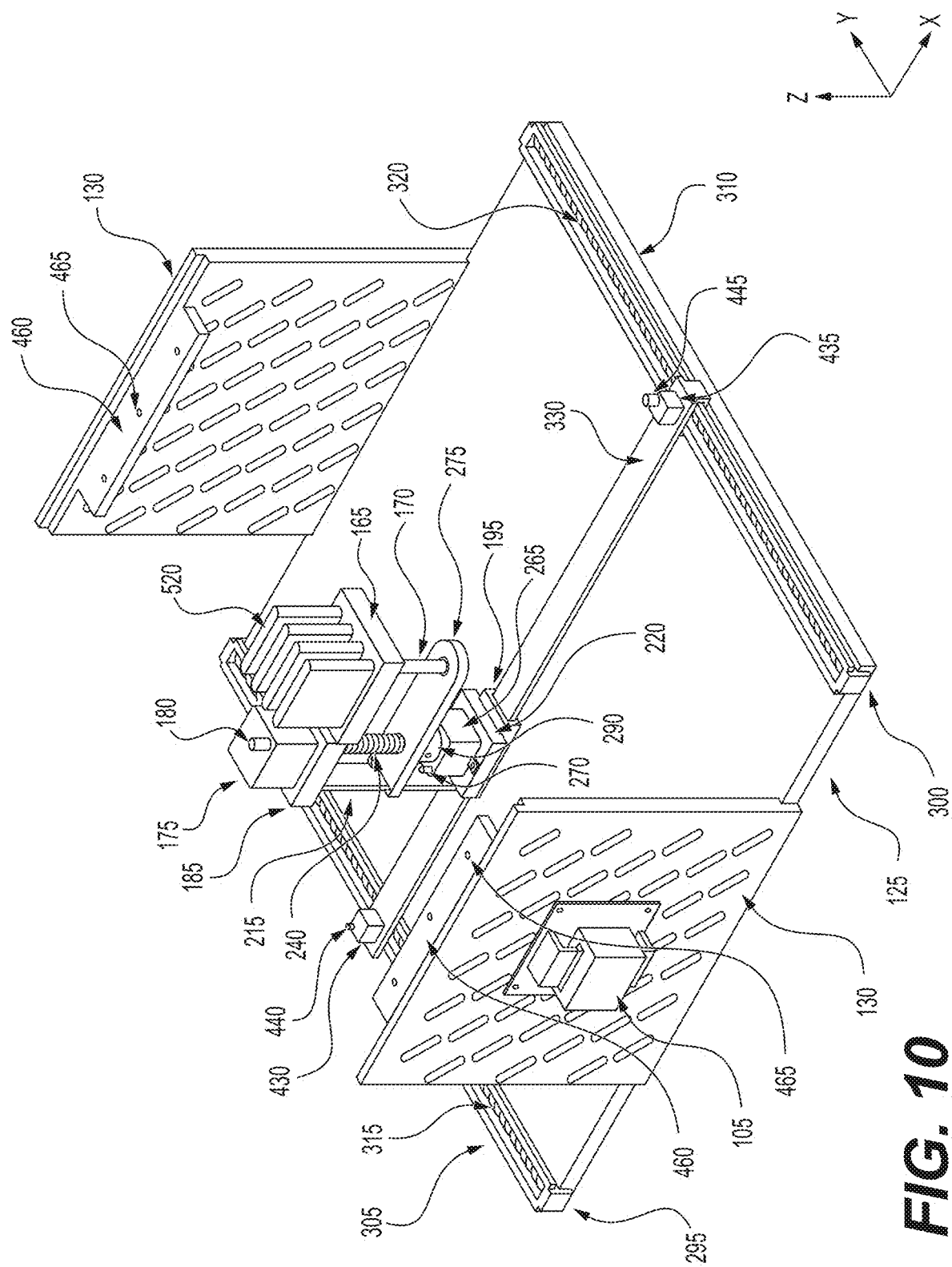
FIG. 10 is a partial perspective view of an alternative embodiment of the system for printing a 3D object.
Figure 11:
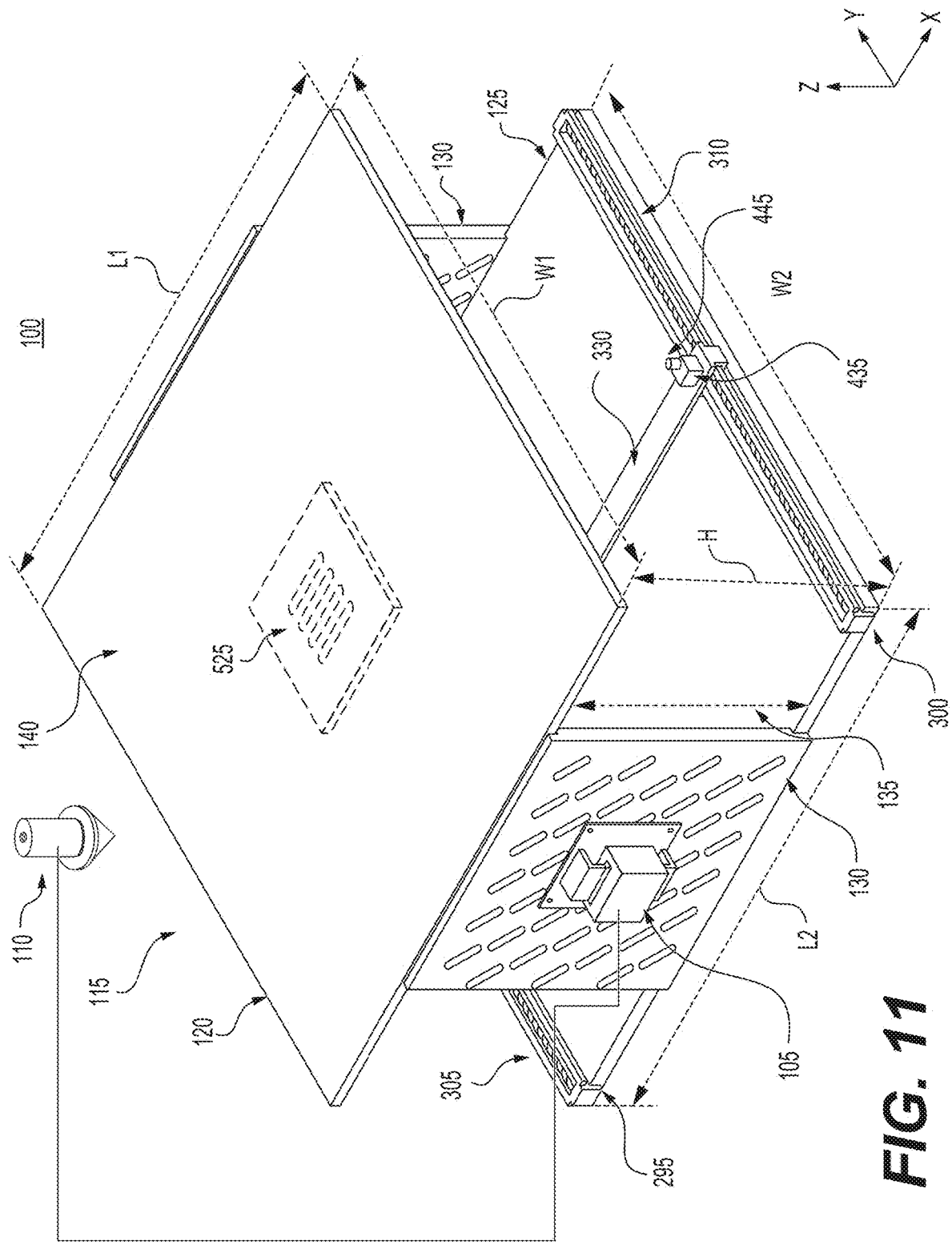
FIG. 11 is a perspective view of the system for printing a 3D object of FIG. 10.

According to a second embodiment of the printing process, as depicted in FIG. 10-11, all of the components of the 3D printer system 100 are the same as shown in FIGS. 1-9 except for the at least one pin 520, which is rectangular in shape, as opposed to the cylindrical shape of the at least one pin 160 as shown in FIG. 3. Additionally, with regard to the second embodiment, as shown in FIG. 11, the at least one through hole (not shown) of the top build platform plate 120 would have a corresponding rectangular shape similar to the at least one pin 520. According to this embodiment, Steps 1-20 can be repeated (including one or more of the alternative steps if applicable), to form a 3D object 525 as illustrated in FIG. 11.

Third Embodiment of the Printing Process

Figure 12:
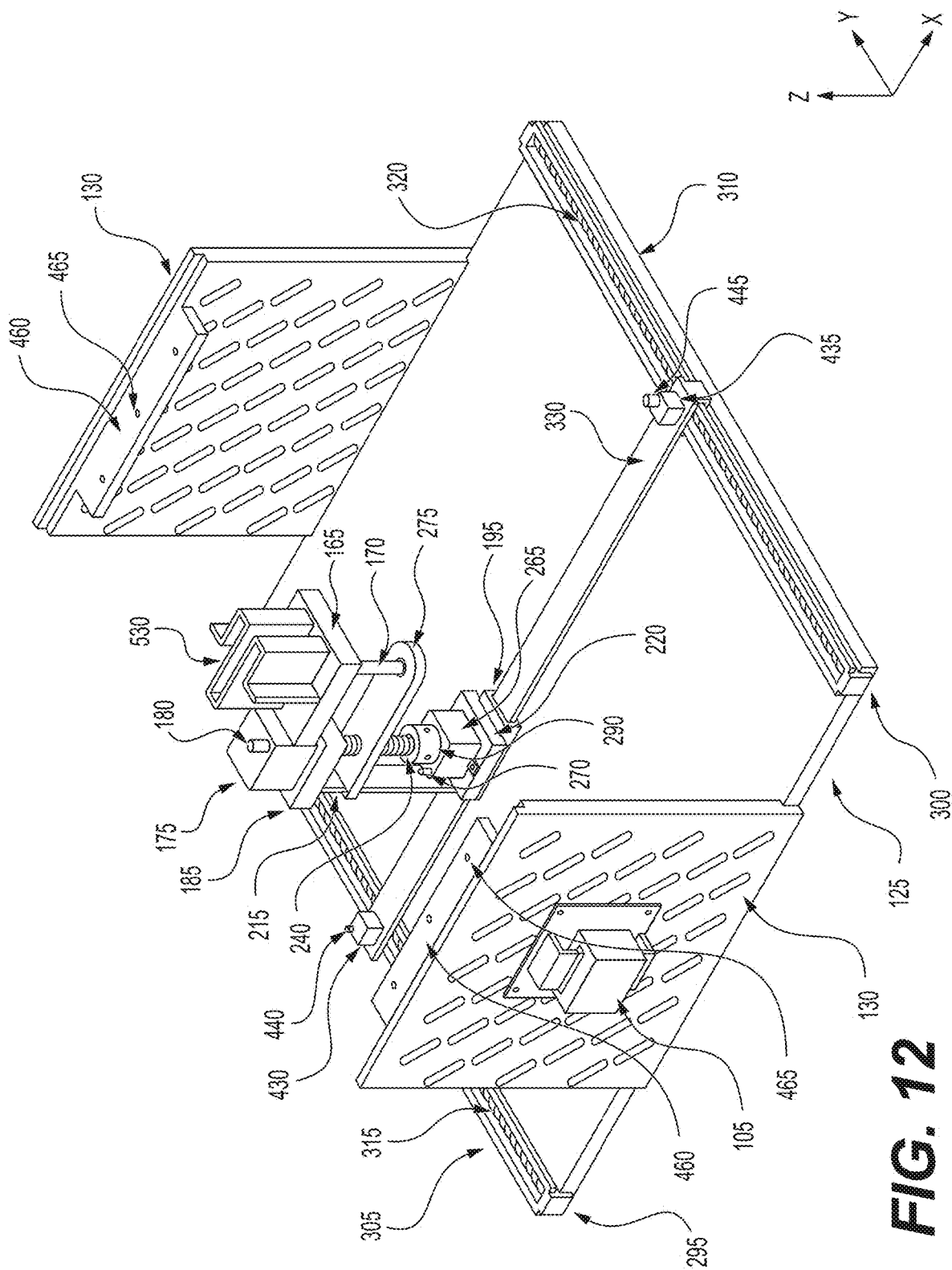
FIG. 12 is a partial perspective view of another alternative embodiment of the system for printing a 3D object.
Figure 13:
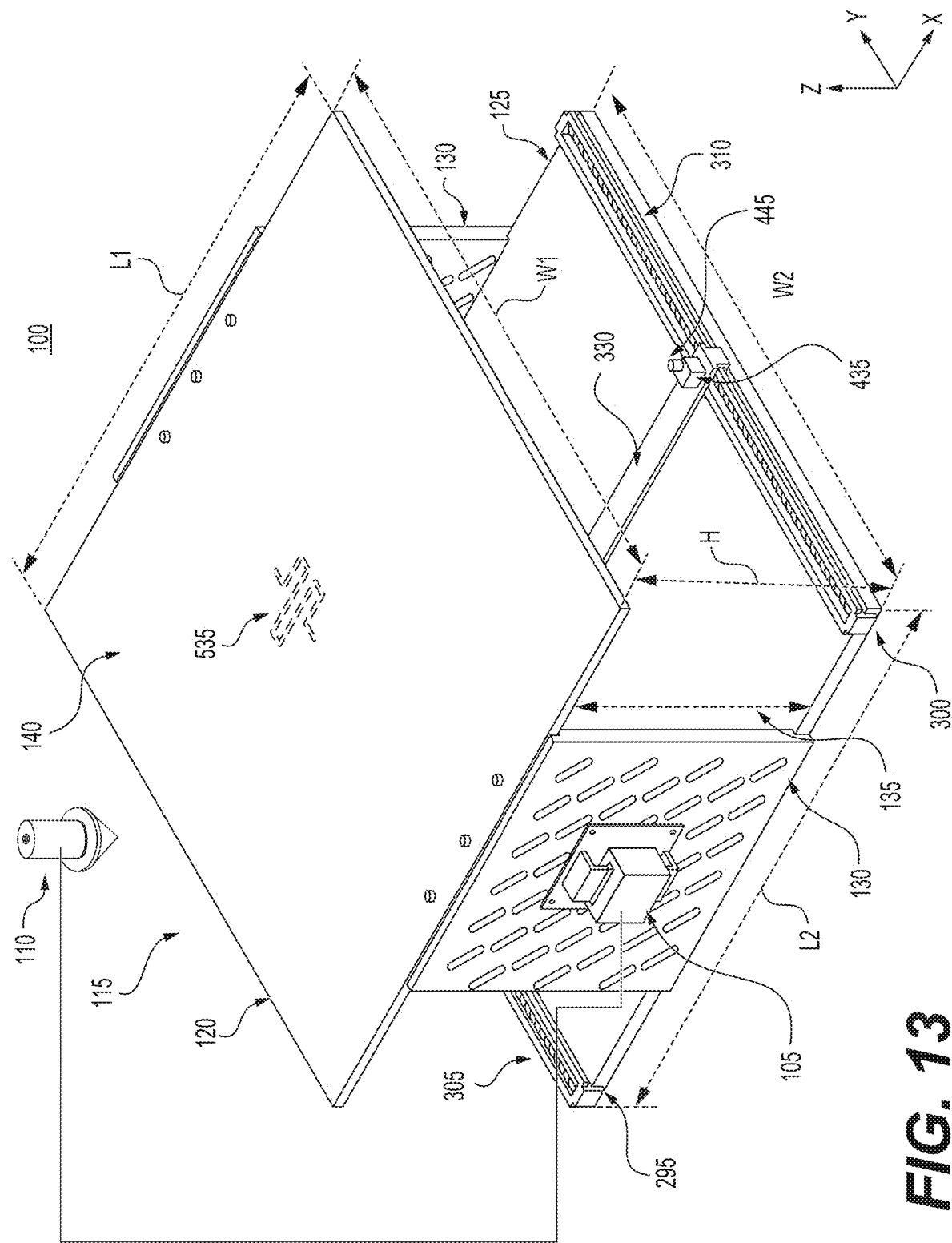
FIG. 13 is a perspective view of the system for printing a 3D object of FIG. 12.

According to a third embodiment of the printing process, as depicted in FIG. 12-13, all of the components of the 3D printer system 100 are the same as shown in FIGS. 1-9, except for the at least one pin 530 which has a shape that is different from the cylindrical shape of the at least one pin 160 as shown in FIG. 3. Additionally, with regard to the third embodiment, as shown in FIG. 13, the at least one through hole (not shown) of the top build platform plate 120 would have a corresponding shape similar to the at least one pin 530. According to this embodiment, Steps 1-20 can be repeated (including one or more of the alternative steps if applicable) to form a 3D object 535 as illustrated in FIG. 13.

It is to be understood that the system and the method for printing a three-dimensional (3D) object are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A system for printing a three-dimensional object, comprising:
   a primary control unit;
   a build platform assembly comprising:
      a top build platform plate having a first surface, a second surface, and at least one through hole formed therethrough, wherein the first surface of the top build platform plate is configured for building a three-dimensional (3D) object thereon;

a bottom build platform plate located beneath the top build platform plate;

at least one support plate located between the top build platform plate and the bottom build platform plate, a length of the at least one support plate defining a separation space extending in a z-axis direction between the top build platform plate and the bottom build platform plate, and wherein the top build platform plate is connected to the bottom build platform plate via the at least one support plate;

a pin assembly, located within the separation space, comprising at least one pin configured to pass through the at least one through hole;

a primary controller assembly comprising:
    a primary motor comprising a primary sensor, the primary motor being configured to move the at least one pin in an x-axis direction;
    a secondary control unit attached to the primary motor and in communication with the primary control unit, the secondary control unit being configured to receive a first primary received signal or a second primary received signal from the primary control unit and to send a first primary sent signal or a second primary sent signal, respectively, to the primary sensor to activate the primary motor thereby moving the at least one pin in a first travel path or a second travel path, respectively, in the x-axis direction; and a movable nozzle in communication with the primary control unit, the movable nozzle being configured to receive a first quaternary sent signal from the primary control unit to extrude at least one extrudable material onto the first surface of the top build platform plate for creating the three-dimensional object thereon.

2. The system for printing a three-dimensional object of claim 1, wherein the primary controller assembly further comprises:

a movable base comprising an upper channel member and a slotted lower member attached thereto, wherein the slotted lower member comprises a first slot;

a first bearing located within the first slot, wherein the primary motor is electrically connected to the first bearing; and an elongated plate attached to the secondary control unit and the movable base.

3. The system for printing a three-dimensional object of claim 2, wherein the primary controller assembly further comprises:

a motor base plate attached to the upper channel member of the movable base;

a second bearing and a third bearing located within a recess of the secondary control unit and the motor base plate, respectively;

a threaded rotatable shaft comprising a first portion and a second portion, wherein the first portion and the second portion of the threaded rotatable shaft are configured to reside within a recess of the second bearing and the third bearing, respectively; and a secondary motor comprising a secondary sensor, wherein the secondary motor, connected to the threaded rotatable shaft and located between the motor base plate and the secondary control unit, is configured to rotate the threaded rotatable shaft.

4. The system for printing a three-dimensional object of claim 3, wherein the primary controller assembly further comprises:

a holder plate located between the secondary motor and the secondary control unit, wherein the holder plate is slidably attached to the elongated plate, the holder plate comprising a through opening and a cavity, and wherein the threaded rotatable shaft is threadedly engaged with the holder plate via the through opening; and a rest base connected to the threaded rotatable shaft and located between the holder plate and the secondary motor, wherein the rest base is configured to limit movement of the holder plate.

5. The system for printing a three-dimensional object of claim 4, wherein the pin assembly further comprises:

a pin support member configured to hold the at least one pin; and a support member rod attached to the pin support member, wherein a portion of the support member rod is configured to reside within the cavity of the holder plate.

6. The system for printing a three-dimensional object of claim 5, wherein the bottom build platform plate further comprises:

a first channel and a second channel located at a first end and a second end of the bottom build platform plate, respectively;

a first screw housing and a second screw housing located within the first channel and the second channel of the bottom build platform plate, respectively; and a first threaded screw and a second threaded screw located within the first screw housing and the second screw housing, respectively.

7. The system for printing a three-dimensional object of claim 6, further comprising: a track assembly comprising:

a longitudinal track extending a length of the bottom build platform plate, the longitudinal track comprising an upper plate and a lower plate attached thereto, wherein the lower plate comprises a first inner bracket and a second inner bracket, the first inner bracket and the second inner bracket are slidably attached to an outer first surface of the first screw housing and the second screw housing, respectively, and wherein the first inner bracket and the second inner bracket comprise a second slot and a third slot, respectively; and a third threaded screw comprising a first end and a second end, the first end and the second end of the third threaded screw are located within the second slot and the third slot, respectively, wherein the upper channel member of the movable base is configured to slidably attach to the upper plate of the longitudinal track, and wherein the slotted lower member of the movable base is configured to threadedly engage with the third threaded screw via the first bearing.

8. The system for printing a three-dimensional object of claim 7, wherein activation of the primary motor causes the first bearing within the first slot of the slotted lower member to rotate in a first direction or a second direction, thereby moving the at least one pin in the first travel path or the second travel path, respectively, in the x-axis direction via movement of the movable base in the respective travel path.

9. The system for printing a three-dimensional object of claim 5, wherein the primary control unit is further configured to send a first secondary sent signal or a second secondary sent signal to the secondary sensor of the secondary motor to activate the secondary motor thereby moving the at least one pin in a third travel path or a fourth travel path, respectively, in the z-axis direction via a movement of the holder plate in the respective travel path.

10. The system for printing a three-dimensional object of claim 7, wherein the lower plate further comprises:
   a first outer bracket and a second outer bracket, the first outer bracket and the second outer bracket being adjacent to the first inner bracket and the second inner bracket, respectively, wherein the first outer bracket and the second outer bracket are slidably attached to an outer second surface of the first screw housing and the second screw housing, respectively;
   a first slotted component and a second slotted component, the first slotted component and the second slotted component being located within the first screw housing and the second screw housing, respectively, wherein the first slotted component and the second slotted component comprise a fourth slot and a fifth slot, respectively; and
   a fourth bearing and a fifth bearing located within the fourth slot and the fifth slot, respectively, of the first slotted component and the second slotted component, respectively.

11. The system for printing a three-dimensional object of claim 10, wherein the first slotted component and the second slotted component are configured to threadedly engage with the first threaded screw and the second threaded screw, respectively, via the fourth bearing and the fifth bearing, respectively.

12. The system for printing a three-dimensional object of claim 11, further comprising:
   a tertiary motor comprising a tertiary sensor, the tertiary motor being located above the first screw housing and attached to a first portion of the upper plate of the longitudinal track; and
   a quaternary motor comprising a quaternary sensor, the quaternary motor being located above the second screw housing and attached to a second portion of the upper plate of the longitudinal track,
   wherein the tertiary motor and the quaternary motor are electrically connected to the fourth bearing and the fifth bearing, respectively, within the fourth slot and fifth slot, respectively.

13. The system for printing a three-dimensional object of claim 12, wherein the secondary control unit is further configured to receive a first tertiary received signal or a second tertiary received signal from the primary control unit and to send a first tertiary sent signal or a second tertiary sent signal, respectively, to the tertiary sensor and the quaternary sensor to activate the tertiary motor and the quaternary motor, respectively, thereby causing the fourth bearing and the fifth bearing within the fourth slot and the fifth slot, respectively, to rotate in a third direction or a fourth direction.

14. The system for printing a three-dimensional object of claim 13, wherein the rotation of the fourth bearing and the fifth bearing in the third direction or the fourth direction causes the track assembly to move in a fifth travel path or a sixth travel path, respectively, in a y-axis direction thereby moving the at least one pin in the respective travel path.

* * * * *